United States Patent

[11] 3,626,051

| [72] | Inventor | James P. Liautaud<br>141 Grissom Lane, Hoffman Estates, Ill. 60172 |
|---|---|---|
| [21] | Appl. No. | 859,361 |
| [22] | Filed | Sept. 19, 1969 |
| [45] | Patented | Dec. 7, 1971 |

[54] INJECTION MOLDING ENCAPSULATION OF PAPER-WOUND FLYBACK TRANSFORMERS AND THE LIKE
2 Claims, 10 Drawing Figs.

[52] U.S. Cl. ................................................ 264/272, 264/275, 264/328
[51] Int. Cl. ........................................ B29c 6/02, B29f 1/08
[50] Field of Search ............................... 264/328, 272, 275, 279

[56] References Cited
UNITED STATES PATENTS

| 2,501,863 | 3/1950 | Cox | 264/328 X |
| 2,983,958 | 5/1961 | Fay | 264/272 X |
| 3,294,890 | 12/1966 | Davis | 264/328 X |
| 3,375,312 | 3/1968 | Hart | 264/272 |
| 3,389,749 | 6/1968 | Towns | 264/328 X |

FOREIGN PATENTS

| 93,254 | 1959 | Norway | 264/272 |

Primary Examiner—Robert F. White
Assistant Examiner—Richard R. Kucia
Attorneys—Fred S. Lockwood, Guy A. Greenawalt, John D. Dewey and John L. Alex ABSTRACT: High speed, high pressure, close tolerance plastic encapsulation of electrical and electronic articles having fragile portions is accomplished by an injection molding method which includes dividing the incoming stream of plastic into a plurality of substantially equal streams prior to entry of plastic into the mold cavity, and directing the equal streams into the cavity along injection lines which pass through channels between the sides of the article and the cavity walls. These lines are parallel to the sides of the article, and are not directed against the fragile portion. In a preferred embodiment air, venting from the cavity being filled, is employed to automatically assist in the equalization of the streams. In this preferred embodiment, not only are incoming streams at the same side of the article equalized, but moreover the technique assists in equalizing the pressure and quantity of material being injected along opposite sides of the article.

Inventor
James P. Liautuad
By Dorbo, Robertson and Vandenburgh
Attys.

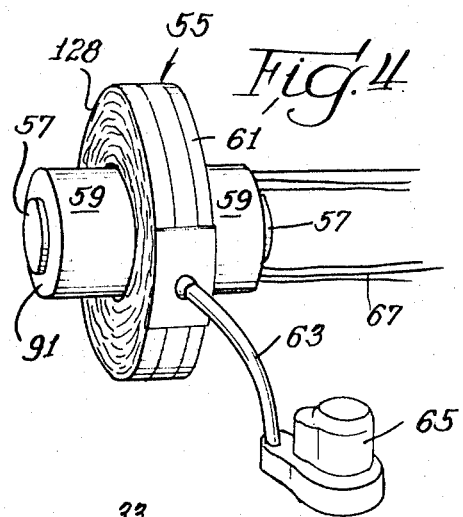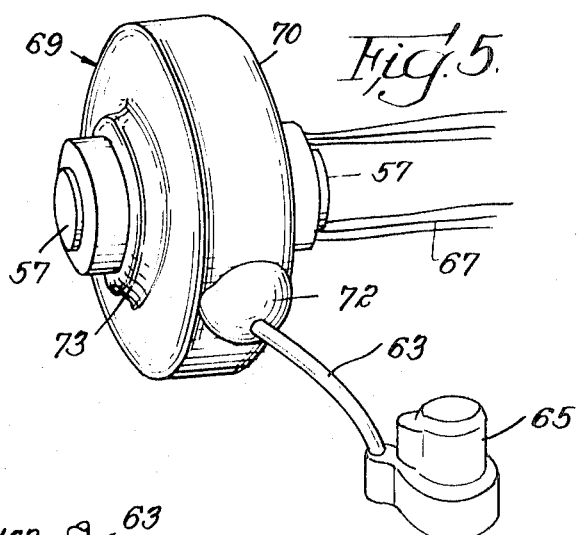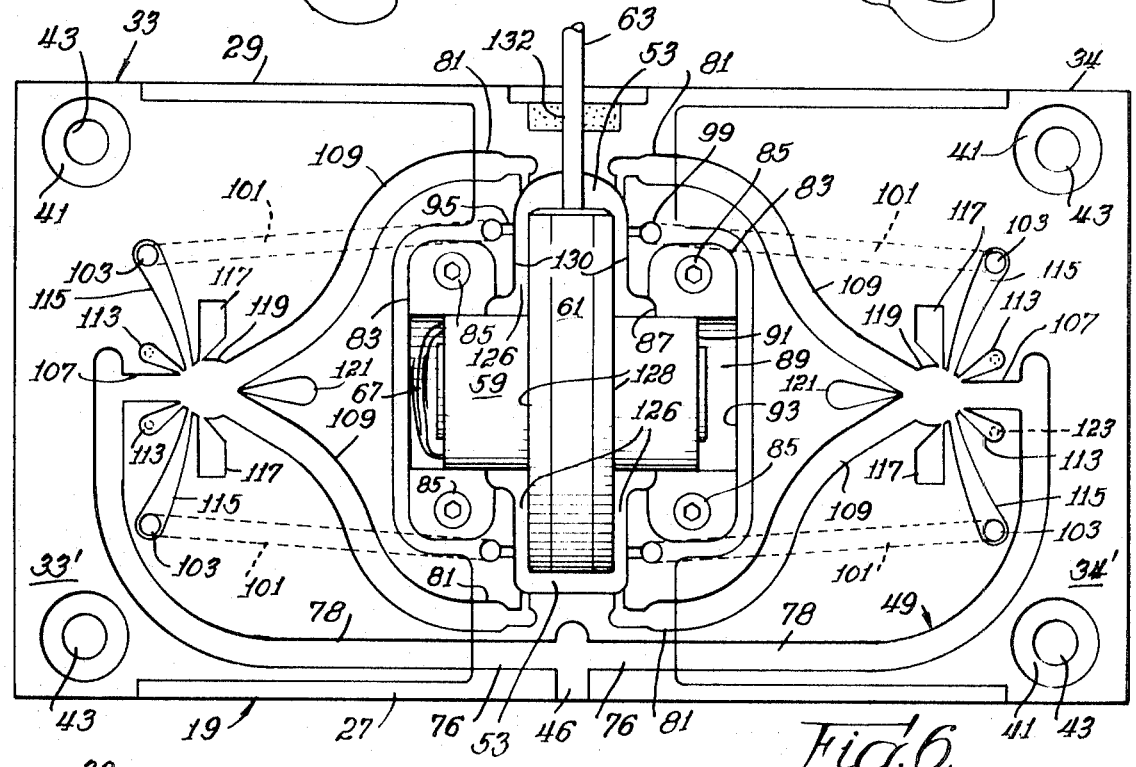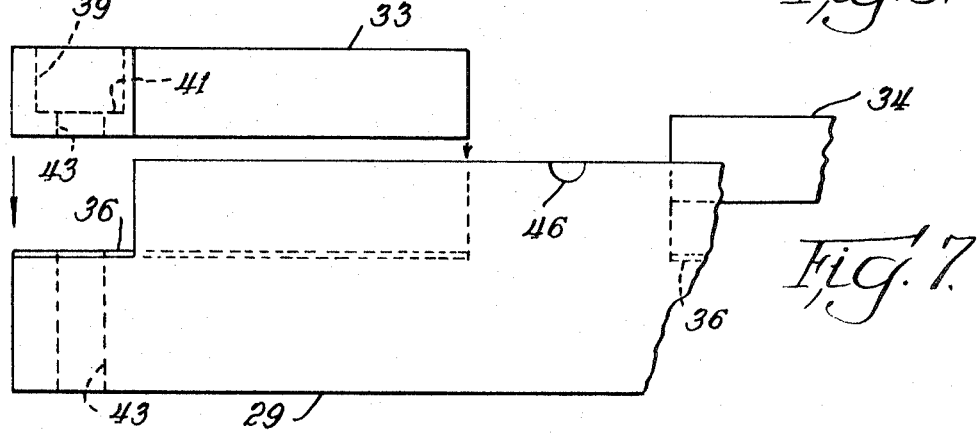

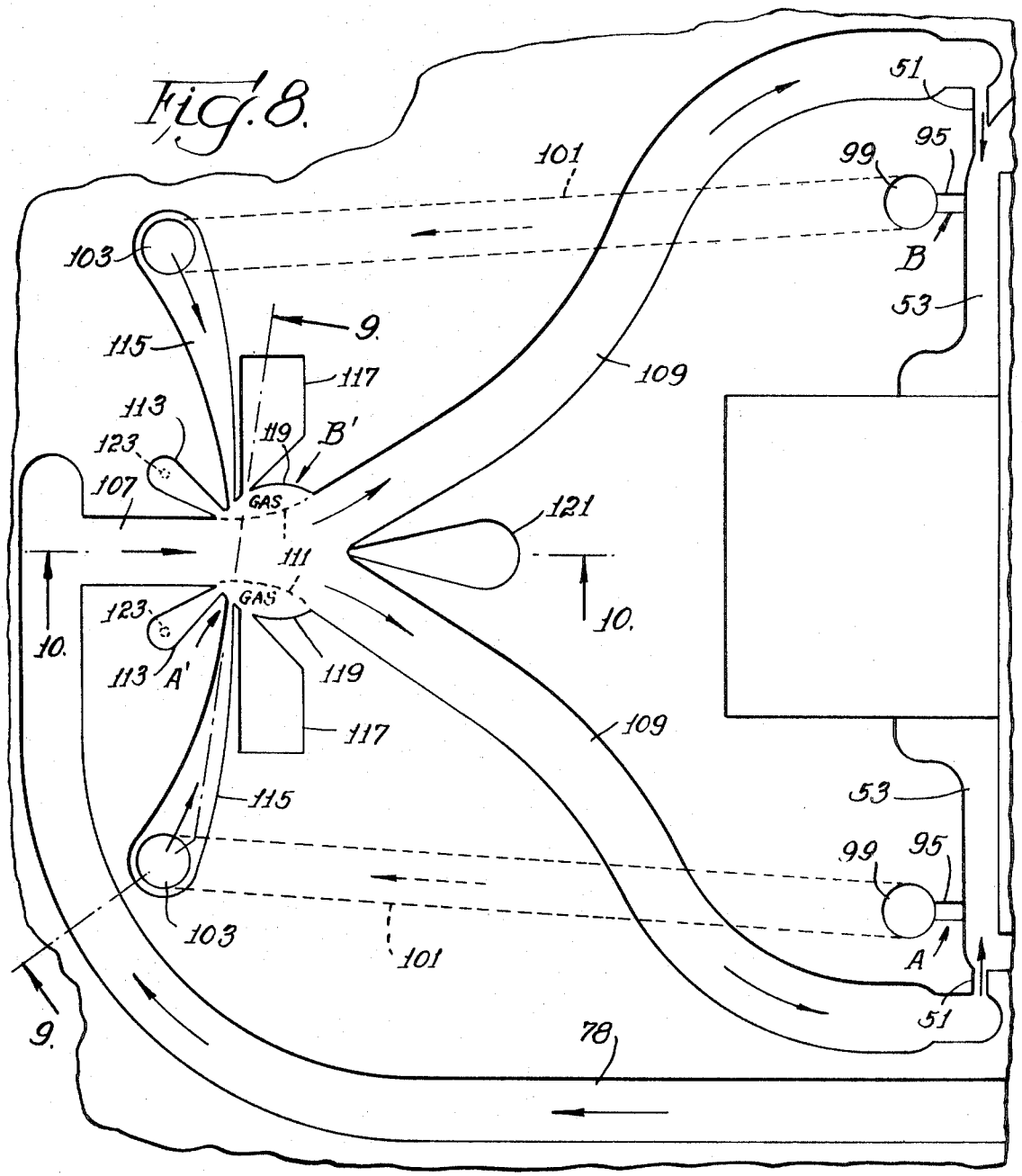
Fig. 8.
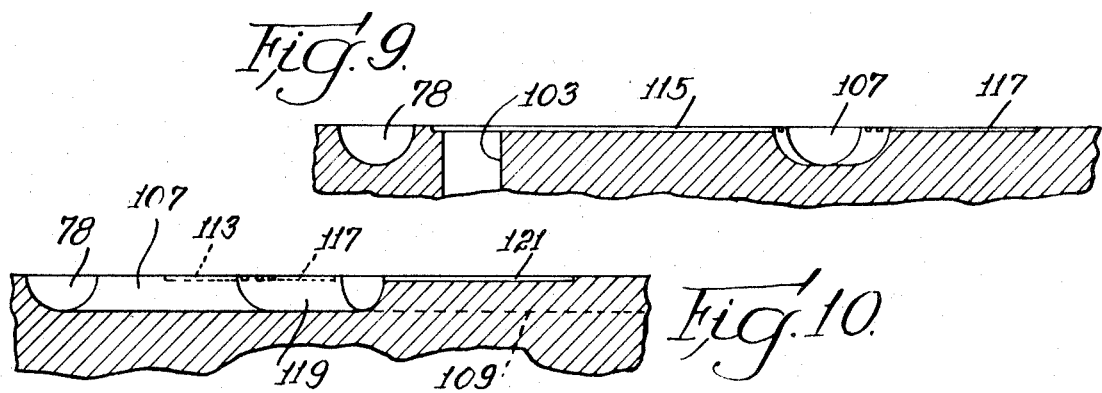
Fig. 9.
Fig. 10.

INJECTION MOLDING ENCAPSULATION OF PAPER-WOUND FLYBACK TRANSFORMERS AND THE LIKE

BACKGROUND OF THE INVENTION

In encapsulation of electrical or electronic articles, using high pressure injection molding of thermoplastics, it is necessary to locate or mechanically support parts being encapsulated because of the forces being imparted by the jet of incoming plastic during encapsulation. Mechanically supporting strong portions or appendages of an article during injection molding encapsulation presents little problem. However, many electrical and electronic articles include both strong and fragile portions or appendages, and the fragile portions often cannot survive either mechanical support during encapsulation, or the destructive forces of the incoming plastic in conventional injection molding techniques. An example of such a dual structured article is a paper-wound flyback transformer, which includes a relatively strong yoke and primary coil, and a secondary coil which is paper-wound and of rather fragile construction. Paper-wound flyback transformers could not be encapsulated using conventional injection molding techniques because of the destructive force of the incoming plastic, and because of the residual shrinkage-derived distortion. As a consequence, the entire industry involved in the manufacture and encapsulation of these coils was required to utilize standard hand casting and potting techniques, requiring relatively long curing cycles and relatively large labor cost. It is desirable to provide a method for encapsulating fragile articles in plastic in order to substantially reduce the time involved in processing, and to reduce the labor cost. Moreover, it is highly desirable to provide an encapsulating method and equipment for encapsulating such articles since the dimensional tolerances of the finished product produced by injection molding are extremely close and reliable, especially when compared to some of those produced by hand-potting techniques. Moreover, within the last few years a number of "new" thermoplastic resins which will withstand temperatures even higher than materials previously available have been introduced. It is the property of greater temperature resistance that makes thermoplastics desirable for use in thermoplastic encapsulation of many electrical or electronic articles. Typical of the new high temperature thermoplastics are polysulfone, unmodified and modified polyphenylene oxide (PPO), and asbestos-filled polypropylene. Since approval by Underwriters Laboratories is virtually mandatory in determining whether the plastic material is suitable for use in an appliance or home entertainment product, it is highly desirable to provide encapsulating methods which can utilize materials meeting requirements for continuous operating temperature in the 90° C. group and in the 105° C. group. Today, since there are three thermoplastic materials which have UL approval for 105° C. operation (polyvinyl chloride (PVC), nylon, and polysulfone), PVC being rated as group 1 self-extinguishing), and since two most commonly used materials are PPO and self-extinguishing grades of polypropylene, the latter two materials meeting the 95° requirement, it is highly desirable to use these materials to encapsulate electronic and electrical components intended for use in applicances and home entertainment products. Nonetheless, using conventional injection molding techniques, relatively fragile electronic or electrical articles, e.g., the paper-wound flyback transformers, have not been satisfactorily encapsulated. As indicated above, one of the problems encountered in the prior method has been the distortion and fracturing of sensitive portions after the molding cycle because of residual shrinkage of the encapsulating material. When the densities of the encapsulating material are uneven, unequal stress is placed on the components and failure is almost certain to occur. Moreover, since pressures of 10,000 to 20,000 pounds per square inch are conventionally used in injection molding techniques, the incoming streams of material, using conventional injection molding techniques, tended to tear up or distort fragile portions of electronic or electrical articles. This invention provides a method and apparatus for injection molding relatively fragile electrical and electronic articles using otherwise conventional injection molding auxiliary equipment. This method provides for the development of virtually uniform density throughout the encapsulant with the result the damage inflicted because of uneven stress due to uneven shrinkage. This invention provides for encapsulation of relatively fragile articles having a long dimension and a narrow dimension, the encapsulation being by injection molding technique which does not significantly distort the shape of the article.

SUMMARY OF THE INVENTION

Distortion of relatively fragile electronic or electrical articles by incoming jets of plastic encapsulant or by uneven stress due to uneven density of encapsulant is virtually eliminated by placing the article in a mold cavity sized to provide a channel between the article and the cavity wall, and injecting and directing a plurality of substantially identical encapsulant streams along a line passing along the cavity, the line being spaced apart from the article. In one embodiment a mold assembly is fitted with runner systems which repeatedly split the stream of thermoplastic being injected into the sprue by the auxiliary molding equipment, the result being the formation of a plurality of substantially equal streams of plastic. In a preferred embodiment, air, venting from the mold cavity because of the injection of the plastic therein, is utilized to automatically assist in the balancing and equalizing of the incoming plastic streams by means of an air-plastic fluidic circuit.

DESIGNATION OF THE FIGURES

FIG. 4 is a perspective view of a paper-wound flyback transformer which is to be encapsulated by injection molding in accordance with this invention.

FIG. 5 is a perspective view of the flyback transformer shown in FIG. 4 after being encapsulated in accordance with this invention.

FIG. 6 is a plan view of the lower half of the mold illustrated in FIG. 1.

FIG. 7 is a fragmentary elevational view of the mold-half illustrated in FIG. 6.

FIG. 8 is an enlarged fragmentary plan view of the left portion of the fluidic circuit of the mold-half illustrated in FIG. 6.

FIG. 9 is a fragmentary cross-sectional view taken approximately along the line 9—9 of FIG. 8.

FIG. 10 is an enlarged fragmentary cross-sectional view taken approximately along the line 10—10 of FIG. 8.

DESCRIPTION OF PREFERRED EMBODIMENTS

Figure 1:
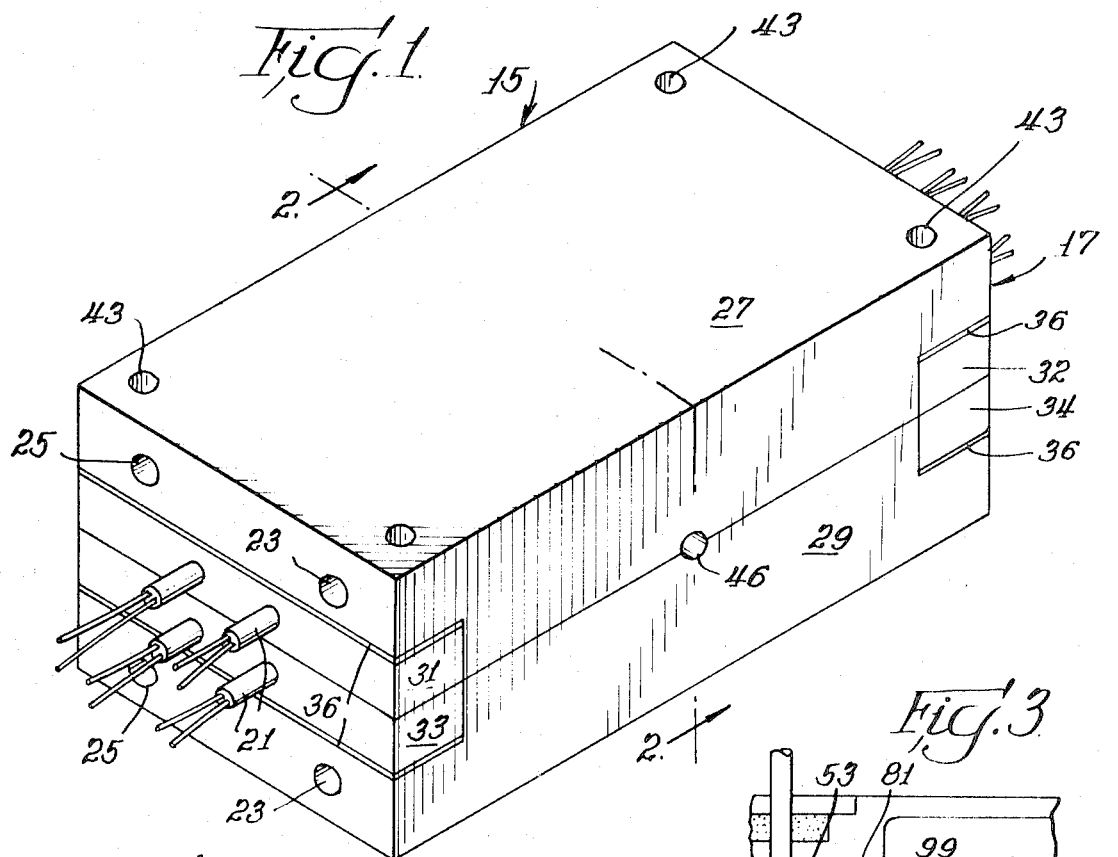
FIG. 1 is a perspective schematic view showing a mold improved in accordance with this invention.
Figure 2:
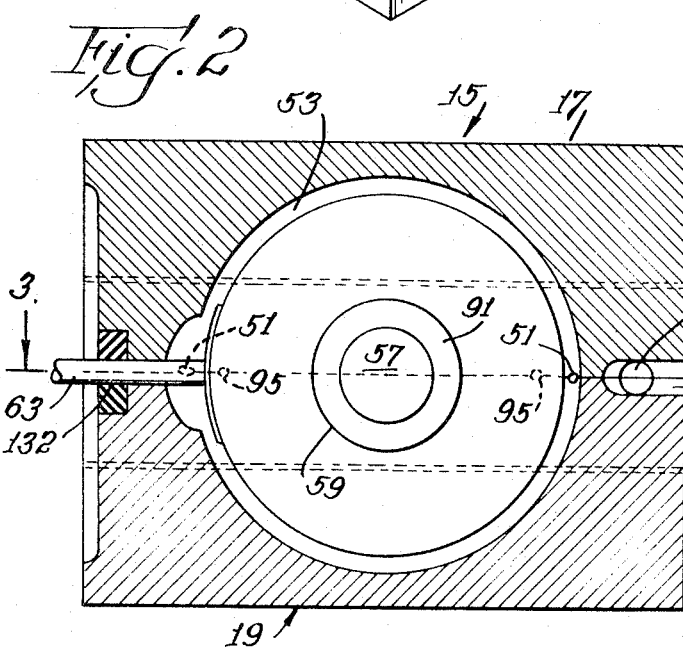
FIG. 2 is a cross-sectional view taken approximately along the line 2—2 of FIG. 1.

Mold assembly, generally 15, comprising an upper half 17 and a lower half 19 is provided with electrical heating leads 21 and coolant water inlets 23 and outlets 25. Each half 17, 19 includes cavity module 27, 29, and each half 17, 19, includes laterally disposed runner modules 31, 32, 33, 34. An asbestoslike sheet 36 separates water cooled cavity modules 27, 29, from their respective heater runner modules 31, 32, and 33, 34, respectively. Heated runner modules 31, 32, 33, 34 are secured to their respective mold-cavity modules by means of conventional bolts (not shown), the heads of which reside in enlarged portion 39 against shoulders 41, the shanks of which pass through openings 43 and secure molds to conventional mold platens (not shown). Thus the faces of mold-halves 17, 19, including opposing faces of mold cavity modules 27, 29 and opposing faces of opposing runner modules 31, 33, and 32, 34 are machined to provide completely flat abutting surfaces, except for the recessed portions which define sprue 46, runners, generally 49, gates, generally 51 mold cavity, generally 53, and other functional recesses which will be described in detail hereinafter.

PAPER-WOUND FLYBACK TRANSFORMER

The paper-wound flyback transformer is illustrative of electronic and/or electrical articles which have a relatively fragile portion and which can be encapsulated in accordance with this invention. An example of such a transformer is illustrated in FIG. 4 as transformer, generally 55, and is made up of a somewhat elongated tubular yoke 57 around which is wound elongated primary coil 59, primary coil 59 being relatively strong and dimensionally stable. Around primary coil 59 is wound relatively narrow secondary coil 61, comprising a coil of wires separated by narrow paper strips. Secondary coil 61 is relatively easily damaged and distorted and, needless to say, the paper secondary coil is incapable of withstanding substantial lateral pressure differentials. High voltage lead 63 passes radially from the outer edge of secondary coil 61 and connects to snap-on connector 65, lead 63 and connector 65 constituting a takeoff assembly. A plurality of leads 67 extend axially from one end of primary coil 59.

In accordance with this invention the relatively fragile secondary coil portion of the flyback transformer is encapsulated for both support and protection inasmuch as a relatively uniform cover layer of encapsulant 70 surrounds most of the side and edge regions of secondary coil 61, and inasmuch as relatively thicker coverings 72, 73 are provided in the region immediately adjacent high voltage lead 63 and on both sides of secondary coil 61 immediately adjacent primary coil 59. Thickened regions 72, 73 provide increased strength, and afford greater sealing protection in these critical areas. Thus as illustrated in FIG. 5, the outer surface of encapsulant 69 represents the inner surface of cavity 53.

MOLD-CAVITY MODULES

Figure 3:
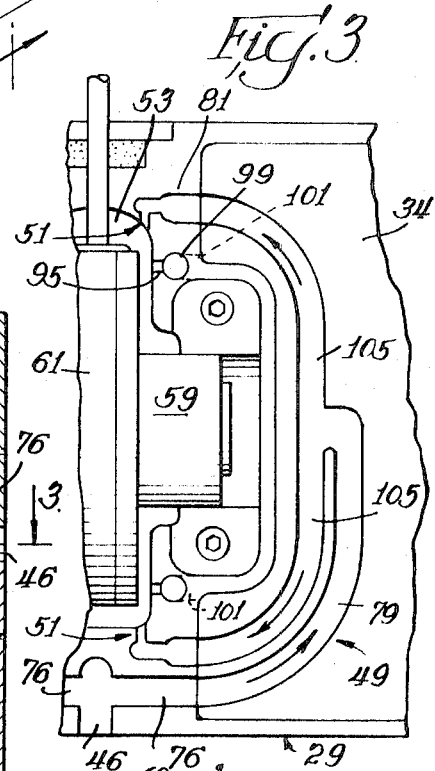
FIG. 3 is a fragmentary cross-sectional plan view taken approximately along the line 3—3 of FIG. 2.

The same mold modules 27, 29 are used in the embodiments illustrated in FIG. 3, and in FIGS. 6 through 10. Mold-cavity module 29 provides recesses which when opposed by module 27, which is a mirror image of module 29, constitute many of the functioning parts or channels described immediately hereinafter. For example, sprue 46 branches into lateral runner portions 76. These connect with runner portions 78 or 79 in runner modules 33, 34, or 34' respectively. In the illustrated embodiment mold-cavity module 29 also includes four terminal portions 81 of the runner system which connect with corresponding runners in the runner module which will be described in detail hereinafter. Terminal portions 81 of the runner systems connect with the gates 51 which empty into cavity 53. Mold-cavity module 29 also includes primary coil support structure, generally 83, on each side of cavity 53. Support structure 83 are integrated into cavity module 29 by Phillips head bolts 85. Cavity facing curved surface 87 constitutes part of the encapsulant confining surface, and circular cradle portion 89 fits closely around the circumference 91 of primary coil 57 to support flyback transformer, generally 55, during molding, and to seal cavity 53 in that region. It is noted that considerable space exists between end 91 of primary coil 59 and end-wall 93. This space is utilized to house leads 67 during the encapsulation of flyback transformer, generally 55. It is noted that mold-cavity module 29 shown in FIG. 3 is the same mold-cavity module shown in FIG. 6. The difference between the overall mold assembly, generally 15, in the embodiments illustrated in FIG. 3 and in FIG. 6 is due to the fact that runner modules 31, 32, 33, 34, which are either identical to or mirror images of the module 34 illustrated in FIG. 3 are replaced by runner modules 31', 32', 33', 34' utilizing the the fluidic circuit. Mold-cavity module 29 is fitted with four shallow air vent outlets 95. These recesses must be shallow enough to prevent passage of fluid plastic therethrough into air conduit means 97. Air conduit means 97 comprises a relatively large diameter circular channel 97 which extends perpendicularly into mold-cavity module 29 a short distance, and connects with channel 101 which extends laterally substantially parallel to the face of module 29. Channel 101, in the embodiment illustrated in FIG. 6 continues into runner module 33', 34' as a recess in the bottom of the runner module and connects with relatively wide diameter channel 103 which extends upwardly to the face of runner module 33', 34'. Thus from the "four corners" of cavity 53 air can pass through vent openings 95, circular channels 99, horizontal channels 101 and upward again through channels 103.

In the embodiment illustrated in FIG. 3, however, air, venting from cavity 53, passes through vents 95 downwardly through channels 99, and horizontally only a sort distance through channel 101 which now dead ends at the interface between module 34 and module 29. Although the interface between modules 29 and 35 is relatively close fitting, the interface does, nonetheless, provide a venting pass for gasses passing through channels 101.

RUNNER MODULES

In the illustrated embodiments two systems of runner modules are illustrated. As indicated above runner modules 31, 32, and 33, are either identical to or mirror images of module 34 illustrated in FIG. 3. In this embodiment the stream of incoming plastic passing through sprue 46 is divided into two streams at lateral runner portions 76 which connect with runner portions 79. Material passing through runner portion 79 is split into two streams in runner branches 105 which connect with terminal portions 81 of cavity modules 27, and 29.

Runner modules 31', 32', 33', 34', similarly take material from runner branch 78 leaving sprue 46 and split the stream into two respective streams. However the latter mentioned modules utilize gas venting from the cavity 53 to assist in equalizing the streams of plastic entering cavity 53. Thus, plastic passing through runner 78 is carried along linear runner leg 107 where it is split into two streams passing through branches 109. Lines 111 indicate the lateral limits of the stream of plastic in passing between leg 107 and branches 109. Projecting laterally from either side of leg 107 are four distinct, but cooperating recesses namely air outlet recess 113, air inlet recess 115, stabilizer recess 117 and enlarged runner portion 119. Stabilizer recess 121 is positioned at the apex of the connection between adjacent lateral branches 109. Thus runner modules 33', 34' are mirror images of each other and are identical in every respect. Runner modules 31', 32' are likewise mirror images or modules 33', 34', respectively except that modules 31', 32' do not include gas conduit means connecting cavity 53 to air inlet recess 115. Modules 31, 32 also include air vents which connect air outlet recess 113 to the atmosphere, the position of the vents being directly opposite the position indicated by the phantom circles 123 in air outlet 113.

Material passing through runners 109 passes into terminal runner portions 81.

OPERATION

Flyback transformer 55 is positioned in mold cavity 53, primary coils 59 being cradled by half circle supports 87, secondary coil 61 being positioned in cavity 53 to provide approximately equal channels 126 on either side of secondary coil 61 between sides 128 of coil 61 and sidewalls 130 of mold cavity 53. High voltage lead 63 is sealingly cradled in channels 132 and upper half 27 of mold assembly is lowered into abutment with lower half of assembly 29. Fluid encapsulant is injected into sprue 46. The operation of the embodiments illustrated in FIG. 3 and in FIGS. 6 through 10 will be discussed separately hereinafter.

In the embodiment illustrated in FIG. 3, incoming fluid encapsulant (not shown) is split at the sprue into right and left-side streams and is carried through runners 79. Each stream is split again into two streams carried through branches 105, and each stream passes to cavity module runner portions 81. The four equal streams of fluid encapsulant are finally injected in cavity 53 through four substantially identical gates 51 positioned at the "four corners" of the midline of cavity 53, the midline being defined as the interface of the opposing mold assemblies 27, 29. Gates 51 are constructed and positioned to direct the incoming plastic along an injection line which passes along channel 126, the injection line being an extension of a midline of gate 51 and running substantially parallel to side 128 of secondary coil 61. The injection lines are ultimately directed against strong primary coil 59, or against walls 130 of cavity 53. Thus from the four gates 51 pass four substantially identical streams of fluid encapsulant, the four streams being substantially identical in terms of pressure and quantity. Some of the gas within chamber 53 vents along the closely fitting interface lines between mold halves 17, 19. Most vents through channel 95 and conduit 99 to the interface between mold cavity modules 27, 29 and runner modules 31, 32, 33, 34. It is well known in the injection molding art that if butting faces are close enough, air can vent therebetween but plastic will not. If recess 95 is .001 inches deep, air readily vents through the opening but plastic does not, even under pressure encountered in injection molding.

Inasmuch as substantially identical streams of plastic are admitted into cavity 53 at the same time, and inasmuch as the incoming streams are directed along a line parallel to sides 128 of secondary coil 61, only very small force vectors perpendicular to sides 128 are generated initially. The perpendicular vectors at opposite sides 128 are equal and opposite in direction. Thus the net distorting forces on secondary coil 61 are substantially zero and fluid encapsulant completely surrounds secondary coil 61 with no significant distortion thereof. Moreover, since the incoming plastic is injected into cavity 53 through a plurality of symmetrically positioned gates 51, and through a symmetrical stream splitting runner system, pressures generated within cavity 53 due to the injection of fluid encapsulant therein are substantially equal at all points throughout cavity 53. Because of the equalization of pressure throughout cavity 53, residual shrinkage of the encapsulant presents no problem in the article so encapsulated.

In the operation of the embodiment illustrated in FIGS. 6 through 10, flyback transformer 55 is positioned in mold module 29 as described hereinbefore. Injection of fluid encapsulant through sprue 46 causes fluid encapsulant to be carried in two equal streams through lateral runners 78, 107 to fluidic controlled portion between legs 107 and branches 109 on its respective side of cavity 53. As fluid encapsulant passes along legs 109 to terminal runner portions 89 and through gates 51, gas trapped in mold cavity 53 can and does pass through conduit 99, 101, 103 into air inlet recess 115. Gas leaving the mouth of air inlet recess 115 passes into the region between line 111 and wall 119, and the size of that region, i.e., the exact location of line 111 at any moment, depends on the momentary amount of pressure generated therein, and this, in turn, depends on the amount of gas passing into inlet 115. Vents 129 eventually carry the gas passing into air outlet recess 113 to the atmosphere.

The following discussion is directed to the mechanism by which the venting air assists in the equalizing and balancing of streams of plastic being injected into cavity 53. It should be emphasized that the system is a dynamic system, a system in a constant state of flux due to the fact that fluid encapsulant is passing through runners 107, 109, 81 and venting air is passing through conduit 101 into air inlet recess 115, more or less continuously during the injection part of the molding cycle. It should also be noted that in spite of the length of the discussion, the injection phase of the injection molding cycle lasts only a short time, e.g., a few seconds, and in some instances, a fraction of a second. Should fluid encapsulant streams passing through one of the four gates 51 momentarily increase in pressure or quantity, this would cause a momentary increase in gas pressure in the immediately adjacent region, and this momentary increase in gas pressure would cause a a momentary increase in rate at which gas passes from cavity 53 through adjacent vent recess 95 and conduits 99, 101, 103, and 115. This illustrated in FIG. 8 in which the letter "A" in vent recess 95 indicates the region in which a momentary increase in gas pressure is sensed and by the letter "A'" indicating the region between line 111 and wall 119 in which the momentary increase in gas pressure causes the line 111 to bulge inwardly into the stream of fluid encapsulant, momentarily decreasing the flow passing into the stream 109 feeding gate 51 adjacent vent region "A." Thus, the relative flow passing through runner 109 to the opposing gate 51 is increased momentarily. However, a momentary increase in pressure at vent "B" has a similar effect of increasing the pressure within the gas mass in region "B'", thus momentarily diminishing the flow towards region "B" and relatively increasing the flow to the region "A." Stabilizers 117, 121 assist in the avoidance of excessive flutter. It is our belief, based on repeated observation, that in normal operation of the illustrated embodiment the vent gas-controlled cycling of material from one side to the other can flip-flop as many as fifty times in a three second injection cycle. Thus, the exit air is automatically used to assist in the equalizing of the streams of plastic passing through gates 51 on the same side 128 of secondary coil 61. However, the gas-controlled equalizing-assist is also effective in assisting the balancing of the pairs of streams being admitted on opposing sides 128 of secondary coil 61. Thus should the streams entering in the regions adjacent "A" and "B" as illustrated in FIG. 8 suddenly increase, the momentary increase in gas pressure would cause constriction of the fluid passing between lines 111 at both regions A' and B' thus momentarily decreasing the flow passing towards regions "A," and "B." Hence the illustrated preferred embodiment also provides a flow-equalizing assist with respect to the sets of pairs of streams of fluid passing along opposite sides 128 of secondary coil 61. Moreover, slight imperfections in symmetry of the piece being encapsulated cause gas pressure differentials also, and these gas pressure differentials cause the fluidic circuit to proportionate, rather than equalize, the flows to achieve and "even" flow to all regions of the cavity.

Upon completion of the injection phase of the cycle, the encapsulant is cooled, (cooling water is circulated through mold cavity module), the mold is open, and the encapsulated article is removed. Plastic remaining in the runner system is lifted out, and, if thermoplastic, is ground up and may be reused.

ACHIEVEMENT

Splitting the incoming fluid encapsulant into a plurality of equal streams and admitting the streams into the cavity surrounding an article to be encapsulated along injection lines which are parallel to the faces of relatively fragile portions, the injection lines being positioned near opposite sides of the relatively fragile portion, has permitted achievement of high speed injection molding of encapsulants while preventing damage to relatively fragile article portions. This technique is found to be extremely valuable in encapsulating paper-wound flyback transformers used in color TV and monochrome TV. These transformers have been required by Underwriters Laboratories to be encapsulated in a material which prevents high voltage from arcing into surrounding components or TV hardware. Also, encapsulation contains the transformer in the event that internal arcing takes place creating a fire hazard. Whereas such encapsulation was previously commonly accomplished by hand dipping components into an encapsulating material such as wax or rubber, the process of this invention permits utilization of a wide variety of materials having high temperature stability and other desirable qualities. In accordance with this invention, these materials can be precisely applied in otherwise conventional injection molding equipment. Thus, not only is the quality of the resulting product improved because of the utilization of more desirable encapsulants, and because more precision is achieved in the dimensioning of the final encapsulated product, but moreover the cost of encapsulation is reduced.

Though the ultimate practical equalizing of the streams of encapsulant being admitted to e.g., 53 is achieved in the preferred gas-plastic fluidic embodiment, the nonfluidic controlled runner system illustrated in FIG. 3 provides a sufficient degree of equalization of incoming streams to permit encapsulation of electrical articles, having relatively fragile appendages or portions, without substantial destruction or distortion of the fragile portion so as to require rejection because of electrical or mechanical defects. The streams admitted on opposite sides of the fragile portions are substantially equal, and moreover are directed along injection lines which are not directed against any part of the fragile portion, e.g., which are substantially parallel to faces of the fragile portion. Thus, only relatively small vectors perpendicular to the face are applied in early stages of the injection cycle, and moreover the vectors being applied to opposing faces are substantially equal. Thus, no substantial distortion takes place, even though high pressures, e.g., 10,000 to 20,000 p.s.i. are achieved, and short times, e.g., fractions of a second to a few seconds are utilized in each injection cycle. Likewise even in the highly controlled fluidic runner system pressures are not absolutely equal, nor are all streams absolutely equal; but rather, the streams are more nearly absolutely equal. Though not absolutely equal, the substantially equal streams generated in accordance with this invention are sufficiently equal so that force differentials of vectors applied to opposite sides of a fragile article are insignificant, and moreover internal pressures generated within the cavity when the cavity is substantially filled with encapsulant are equal throughout.

Therefore I claim:

1. An injection molding method for plastic encapsulation of a paper-wound flyback transformer, said transformer having a relatively strong tubular yoke passing therethrough, a relatively strong primary coil wound around said yoke, and a relatively narrow paper-wound secondary coil wound around the primary coil and extending through a substantial distance radially from said primary coil, said transformer also including a high voltage lead extending radially from the outer circumference of the secondary coil, said transformer also including a plurality of leads extending axially from an end of the primary coil, said method comprising the steps:

a. supporting the transformer in the cavity of an injection mold means by sealingly engaging the entire circumference of the primary coil at both sides of the secondary coil in circular first and second recesses at opposite sides of the cavity at seal lines on the primary coil spaced apart from the secondary coil, the recesses extending beyond the tubular yoke, thereby defining three regions, namely, a mold cavity region between the seal points, and two regions outside of the mold cavity beyond the ends of the yoke in said first and second recesses, said plurality of leads being contained in one of the latter two regions, the first region being the cavity of a mold, said cavity having side walls extending in a generally radial direction with respect to said elongated yoke, and having a circumferential surface connecting said side walls, said cavity being sized to provide a channel between the side walls of the cavity and the secondary coil as well as between the circumferential surface and the secondary coil; and also supporting the transformer by sealingly engaging the entire circumference of a portion of said high voltage lead in a third circular recess extending into the mold from the circumferential surface of said cavity, said third circular recess being spaced apart from said secondary coil; then, b. simultaneously injecting a plurality of streams of plastic in fluid condition into the cavity at each of said side walls through a plurality of respective runners and gates positioned to direct the respective streams of plastic along respective injection lines which pass along said channel, said injection lines being spaced apart from the secondary coil and being directed against said side walls or said primary coil, said streams being injected in pairs directed in opposite directions towards each other, all of the streams being substantially equal in quantity and pressure, the location and direction of the injection lines at one side of the secondary coil being a mirror image of the location and direction of the injection lines at the other side thereof;

c. continuing the injection until the unoccupied space of the cavity is filled;

d. permitting the plastic within the cavity to solidify thus forming a flyback transformer having the secondary coil portion thereof covered with solid encapsulant, the solid encapsulant being sealed to a portion of said primary coil and being sealed around a portion of said high voltage lead; and e. opening the mold and removing the thus encapsulated flyback transformer therefrom.

2. A method of injection molding plastic encapsulants around a fragile portion of an article having a relatively fragile portion and a relatively strong portion, said method comprising the steps:

a. enclosing the article in the cavity of an injection mold means, the cavity having end walls and a side wall, said cavity being sized to provide a channel between all the walls of the cavity and the relatively fragile portion of the article; then, b. simultaneously injecting a plurality of pairs of streams of said plastic in fluid condition, each stream of said pairs being directed in opposite directions toward the other stream of its respective pair, each of said streams being injected into the cavity through a respective runner and gate which is closely associated with an end wall, and is positioned to direct the respective stream of plastic along a respective injection line which extends along the channel between the fragile portion and a wall of the cavity, said injection line being spaced apart from the fragile portion of the article, and being directed against a wall or said strong portion, and wherein the article is positioned between injection lines, all of the streams being substantially equal in quantity and pressure;

c. continuing the injection until the unoccupied space of the cavity is filled with said fluid plastic while continuously determining gas pressure differential between the gas pressure in the region of each of said streams, and continuously adjusting the fluid stream flow rate responsive to said pressure differential to increase fluid flow rate of a stream in relatively low gas pressure area and to decrease fluid flow rate into relatively high gas pressure area;

d. permitting the plastic to solidify, thus forming an encapsulated article having solid encapsulant around the fragile portion of the article; and e. opening the mold and removing the encapsulated article therefrom.

* * * * *